United States Patent [19]

Boynton

[11] 4,209,930
[45] Jul. 1, 1980

[54] FISH ALERT

[76] Inventor: Greg Boynton, 1641 Camelot La., Minneapolis, Minn. 55432

[21] Appl. No.: 928,598

[22] Filed: Jul. 27, 1978

[51] Int. Cl.$^2$ .......................................... A01K 97/01
[52] U.S. Cl. ...................................................... 43/17
[58] Field of Search ...................... 43/16, 17, 17.5, 58; 362/433, 435, 436, 437, 439, 455, 457; 200/308, 310, 317

[56] References Cited

U.S. PATENT DOCUMENTS

| | | |
|---|---|---|
| 2,627,690 | 2/1953 | Kniffer . |
| 2,741,055 | 4/1956 | Weber ........................ 43/17 |
| 2,893,156 | 7/1959 | Warren ....................... 43/17 |
| 2,986,835 | 6/1961 | Ordinetz et al. ............ 43/17 |
| 3,134,187 | 5/1964 | Blakely . |
| 3,473,250 | 10/1969 | Leckell . |
| 3,600,836 | 8/1971 | Miyamae .................... 43/17 |
| 3,601,599 | 8/1971 | Sink ........................ 362/457 X |
| 3,702,513 | 11/1972 | Watts ........................ 43/17 |
| 3,878,635 | 4/1975 | Trosper et al. . |
| 3,913,255 | 10/1975 | Fillmen ..................... 43/17 |
| 3,999,323 | 12/1976 | Vitucci ..................... 43/17 |
| 4,112,607 | 9/1978 | Scher ....................... 43/17 |

FOREIGN PATENT DOCUMENTS 2627638 12/1977 Fed. Rep. of Germany ............. 43/17

Primary Examiner—Othell M. Simpson
Assistant Examiner—Robert P. Olszewski
Attorney, Agent, or Firm—Frost & Jacobs

[57] ABSTRACT

A portable watertight signaling device for attaching to a fishing line to provide a selectable audible or visual alarm indication when a fish exerts a pull on the line. A fish line engaging switch mounted exterior to the housing includes a tension adjustment for varying the amount of pull necessary to activate the switch and actuate the alarm. A switch extending through the housing wall for selecting the audible or visual alarm mounts a circuit board carrying the visual alarm interior to the housing.

11 Claims, 4 Drawing Figures

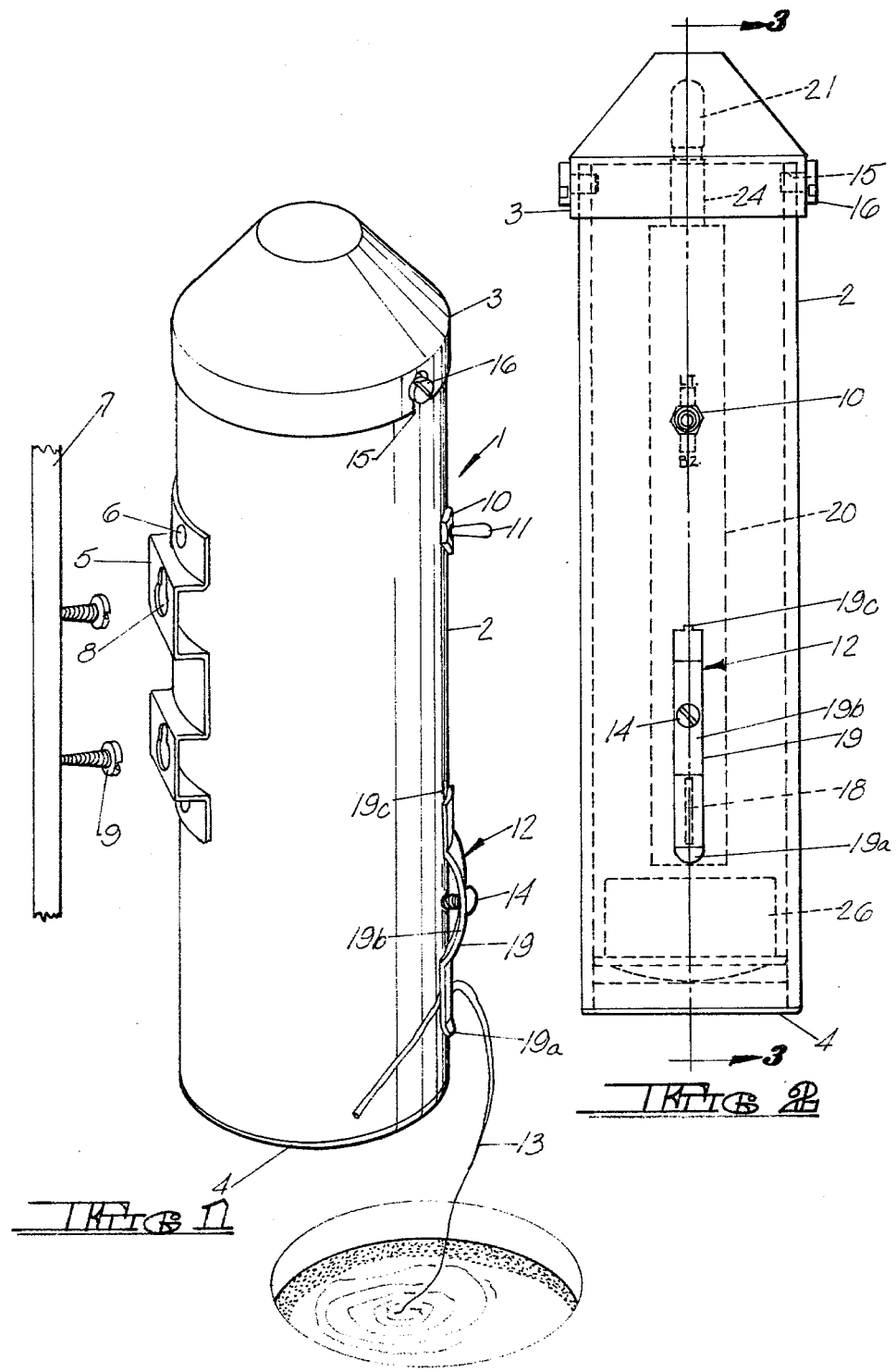

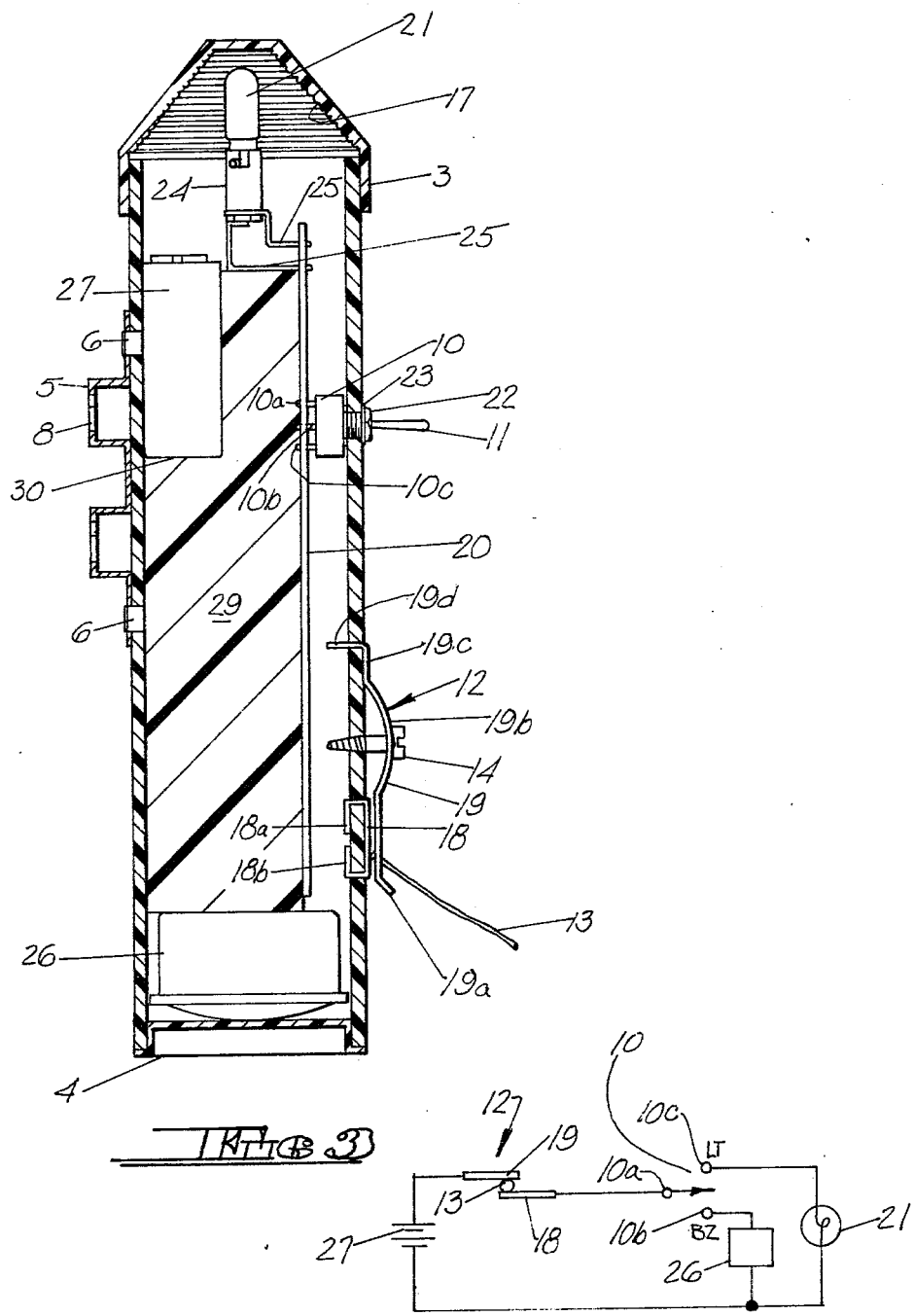

FISH ALERT

BRIEF SUMMARY OF THE INVENTION

The present invention relates generally to signaling devices, and more particularly to a signaling device to provide an alarm indication when a fish exerts a predetermined pull on a fishing line.

Many devices have been proposed for providing a visual or audible indication of a fish strike. Such devices have found widespread application by ice fishing enthusiasts in particular since the ice fishermen can still monitor the condition of the fishing line without exposure to bitter winter weather. However, prior art signaling devices have not faired well under conditions associated with ice fishing. For example, many of these devices lack effective means for anchoring the signaling device, such as to a temporary ice fishing shelter, to prevent their being dragged into the water by the force exerted on the line by a struggling fish. In addition, should the device enter the water, the excessive weight and lack of water tightness usually result in irretrievable loss beneath the ice. Attempts to render such signaling devices watertight have not met with complete success. For example, it has been found difficult to produce a connection of the device to the fishing line which results in maintaining the watertight integrity of the signaling device, while at the same time providing a simple mechanism to easily attach the signaling device to the fishing line to provide an audible or visual indication following a fish strike. One common approach has being to pass the fishing line through the housing of the signaling device with an attachment to a switch or other triggering mechanism within the housing itself. Of course, this not only makes the device difficult to attach to and remove from the fishing line, but also reduces the watertight integrity of the unit.

Prior art attempts to produce a watertight signaling device have also resulted in troublesome assembly problems since insufficient space may be available to mount and seal switching and indicating components. Furthermore, while it has been suggested that the triggering mechanism connected to the fishing line be made adjustable to allow for variations in wind, waves and the force exerted by different species of fish, these mechanisms have been overly complex and mechanically unreliable.

Finally, since most signaing devices are portable, the power source, usually a battery, must be changed periodically. This requirement has further defeated attempts to produce a workable watertight unit. In addition, the battery may show shortened life during operation in cold weather, particularly if both visual and audible alarms are activated simultaneously as a result of a fish strike. Heretofore, prior art signaling devices have not made adequate provision for electing either an audible or visual alarm to conserve battery life, as well as alert the fisherman with the appropriate type of indication.

The fish alert signaing device of the present invention overcomes the deficiencies of prior art devices by providing a portable substantially watertight signaling device easily attachable to a fishing line to provide a selectable audible or visual alarm indication when a fish exerts a predetermined pull on the line. The fish line engaging switch is mounted exterior to the housing of the signaling device and includes a tension adjustment for varying the amount of pull necessary to activate the switch. In addition, the signaling device includes a switch extending through the housing wall for selecting the audible or visual alarm and mounting a circuit board carrying the visual alarm interior to the housing.

While the fish alert signaling device of the present invention has been described and illustrated in terms of providing an indication of a fish strike, it will be understood that the unit finds applicability in any situation where a visual or audible indication is desired following a predetermined force being applied to a trip cord or line, including burglar alarms, visitor indicators, etc.

The fish alert signaling device comprises a generally tube-like cylindrical substantially watertight housing constructed of a light weight, temperature resistent resonous material, one end of the housing terminating in a removable colored translucent lens-like dome, the opposite end of the housing being sealed by a generally circular plug. A force fit is obtained between the removable dome and the housing to insure watertight integrity.

A fishing line engaging switch is secured to the exterior surface of the housing for attachment to the fishing line such that following a predetermined pull on the line, a pair of biased contacts are brought into electrical contact to complete an electrical circuit for producng an alarm indication. The fishing line engaging switch comprises a narrow elongated strip-like electrically conducing contact having a contact surface substantially parallel to the adjacent surface of the housing, the contact including a pair of spaced inwardly directed legs extending through the wall of the housing, the legs being crimped within the housing to hold the contact in a fixed position and form a first switch terminal. A movable contact is provided by an elongated electrically conducting finger-like resilient contact member also secured to the exterior housing of the signaling device. One end of the finger-like contact member forms a contact surface overlying and normally in electrical contact with the strip-like contact, the outermost end of the finger-like contact being upturned to facilitate sliding the fishing line between the pair of contacts. The intermediate portion of the finger-like member is generally curvilinear and spaced from the housing surface, while the extreme end of the finger-like member abuts the housing surface and terminates in a leg extending inwardly through the wall of the housing to form a second switch terminal, as well as secure the finger-like member to the housing. The finger-like member is also secured to the housing by a threaded fastener passing through an aperture in the intermediate portion of the finger-like member and threadedly engaging the housing. by adjusting the fastener, the tension or bias force between the fixed contact member and the movable contact member may be adjusted so that only forces applied to the fishing line greater than a predetermined force will remove the line from between the contacts, thus providing a simple and reliable means for compensating for the effects of wind, waves and striking forces of different species of fish.

A bracket for attaching the housing to a surface, such as the wall of an ice fishing shelter, is secured to the outer surface of the housing and comprises a hanger having a pair of vertically spaced keyhole-shape slots configured to communicate with a pair of spaced screw or nail heads extending outwardly from the mounting surface.

A thin elongated printed circuit board is disposed within the housing substantially parallel to the longitudinal axis of the housing. The printed circuit board mounts a three position switch, one of the positions corresponding to an off position, one of the positions corresponding to the visual indicator, and one of the positions corresponding to the audible indicator. The actuating handle of the switch extends through the wall of the housing so as to mount the switch and the board fixedly within the housing. An incandescent lamp is secured to the upper end of the printed circuit board so as to extend upwardly into the dome. This construction greatly simplifies the fabrication of the unit without compromising the watertight integrity.

A source of power, such as a battery, is also disposed within the housing, and is connected such that the lamp is connected to the source of power and the fish line engaging switch when the three position switch is in a position corresponding to the visual indicator.

An audible indicator device, such as a buzzer or horn, is mounted within the housing adjacent the end plug, and is connected between the battery and the fish line engaging switch when the three position switch is in a position corresponding to the audible indicator.

Finally, a resilient block-like shock absorbing insulator is positioned between the printed circuit board and the inner surface of the housing to maintain the circuit board in place, as well as provide a mounting pocket for the battery.

It will thus be observed that the fish alert signaling device of the present invention provides a substantial watertight unit which is easily attachable to a fishing line, and also provides selectable visual or audible indicators to extend battery life. Futhermore, the construction of the fish alert make it particularly adaptable to harsh weather conditons and mounting problems associated with ice fishing environments.

BRIEF DESCRIPTION OF THE DRAWING

FIG. 1 is a fragmentary perspective view of the fish alert signaling device in an operational ice fishing environment.

FIG. 2 is a front elevation view of the fish alert signaling device of the present invention.

FIG. 3 is a fragmentary side elevation view, partially in cross section, of the fish alert signaling device of the present invention.

FIG. 4 is a schematic diagram of the electrical circuit of the fish alert signaling device of the present invention.

DETAILED DESCRIPTION

The fish alert signaling device, shown generally at 1, comprises a generally tube-like cylindrical housing 2, which is substantially watertight and constructed of a temperature resistant light weight resonous material such as ABS plastic or the like. One end of housing 2 terminates in a removable dome, 3, while the opposite end of the housing is sealed by a generally circular plug 4. A hanger-type mounting bracket 5 is secured to the exterior of housing 2 by rivets 6 or the like for mounting the signaling device 1 to a vertical surface 7 such as might be associated with an ice fishing shelter, tree, piling, etc. Bracket 5 comprises a thin elongated strip of metal or other rigid material having a pair of vertically spaced keyhole-shaped slots 8, the larger diameter aperture of each slot being positioned below the smaller diameter aperture. As is best shown in FIG. 1, slots 8 slidably communicate with a pair of vertically spaced headed fasteners 9, which may be screws or nails secured to surface 7, to hold signaling device 1 in place. It will be observed that housing 1 may be easily removed from the supporting surface 7 as required.

Housing 2 also mounts a three position switch 10 having an actuating handle 11 extending outwardly from the surface of housing 2. When actuating handle 11 is in an upper position, indicated by the designation "LT" the visual indicator will be activated upon an appropriate fish strike. When the actuating handle 11 is in a downward position indicated by the designation "BZ", an audible alarm will be activated. When actuating handle 11 is in the central or neutral position, as shown in FIG. 1, neither of the indicating devices will be actuated. The ability to select either of the indicating devices as required thus contributes to extended battery life.

Housing 2 further mounts a fish line engaging switch, shown generally at 12. As will be explained in more detail hereinafter, fishing line 13 is attached to switch 12 so as to hold a pair of electrical contacts in spaced-apart relationship. When a force is exerted on line 13, the line is pulled from between the electrical contacts, permitting an electrical circuit to be completed. A threaded fastener 14 passing through the intermediate portion of switch 12 provides an adjustment to permit switch activation only upon a force exerted on line 13 greater than a predetermined force.

Turning to FIG. 2 and FIG. 3, lens-like dome 3, which may be constructed of a colored optically transmissive material such as translucent plastic or the like, is force-fitted over one end of housing 2 such that the inner surface of dome 3 makes a substantially watertight seal with the outer surface of housing 2. The lowermost edge of dome 3 contains at least one upwardly extending slot 15 by which dome 3 may be secured to the upper end of housing 2 by a fastener 16 passing through slot 15 in threaded engagement with housing 2. The visibility of dome 3 may be improved by providing a series of spaced annular concentric rings or ridges 17 extending around the inner surface of dome 3.

The opposite end of housing 2 is permanently sealed by a generally thin circular plastic plug 4 force-fitted in the open end of housing 2.

Fishing line engaging switch 12 is secured to the outer surface of housing 2 and comprises a narrow elongated strip-like electrically conducting contact 18 having an upper contact surface substantially parallel to the adjacent surface of housing 2. Contact 18 also contains a pair of spaced inwardly directed legs 18a and 18b which extend through the wall of housing 2 to form a first switch terminal. Legs 18a and 18b are crimped against the inner wall surface of housing 2 to fixedly secure contact 18 to housing 2.

Switch 12 is further made up of an elongated electrically conducting finger-like resilient contact member 19, the inner surface of one end of finger-like member 19 forming a contact surface overlying and in electrical contact with the outermost surface of strip-like contact 18. Since finger-like contact member 19 is constructed of a resilient material, such as spring stainless steel or the like, it will normally be biased against contact member 18. The outermost end 19a of finger-like contact member 19 is upturned so as to be spaced away from the outer surface of housing 2, in order to facilitate positioning fishing line 13 between contact members 18 and 19. The intermediate portion 19b of finger-like member 19 is generally curvilinear and is spaced from the outer surface of housing 2. The extreme end 19c of finger-like member 19 terminates in a leg 19d extending inwardly through the wall of housing 2 to form a second switch terminal, as well as secure member 19 to housing 2.

Finger-like member 19 is also secured to housing 2 by a threaded fastener 14 passing through a cooperating aperture in intermediate portion 19b of finger-like member 19 and threadedly engaging the wall of housing 2. It will thus be observed that by rotating fastener 14 in the appropriate direction, the bias force between contact members 18 and 19 may be varied as desired, such that a predetermined pull on line 13 is necessary to remove the fishing line from between members 18 and 19 and hence bring these members into electrical contact. Since switch 12 is located on the exterior of housing 2, fishing line 13 may be easily connected thereto, and the watertight integrity of the unit is maintained.

Disposed within housing 2 is a thin elongated printed circuit board 20 which not only serves to provide electrical conducting paths for the electrical circuitry thus minimizing the amount of wiring necessary, but also provides a mounting surface for multiple position switch 10 and indicating lamp 21, as will be described in more detail hereinafter. As is best shown in FIG. 3, the three electrical terminals 10a-10c of switch 10 extend through circuit board 20 and are secured thereto such as by soldering or the like by appropriate terminal pads. The opposite end of switch 10 contains actuating handle 11 which extends through the wall of housing 2, switch 10 and its attached circuit board 20 being secured to housing 2 by nut 22, as is well understood in the art. A washer 23 may also be provided between nut 22 and the outer surface of housing 2 to provide a watertight seal.

Lamp housing 24 bearing incandescent lamp 21 is secured to the upper end of circuit board 20 by a pair of pin-like terminals 25 which are soldered to appropriate terminal pads on circuit board 20 in the customary manner. Circuit board 20, socket 24 and lamp 21 are so positioned that lamp 21 extends upwardly within dome 3. It will be observed that this modular-type construction simplifies the fabrication and assembly of the unit, thereby producing a more reliable device.

An audible indicating device 26, such as a horn or buzzer, is disposed within housing 2 such that the sound emitting end of the audible indicator is adjacent plug 4. Inasmuch as plug 4 is constructed of a thin sound-transmitting material, the audible output from audible indicating device 26 is easily heard exterior to the signaling device. A source of power, such as battery 27, is also disposed within housing 2 in a manner to be described in more detail hereinafter.

The electrical diagram for the fish alert signaling device is illustrated in FIG. 4. One terminal of battery 27 is connected to terminal 19 of switch 12, while the other terminal of battery 27 is connected to one terminal of audible indicating device 26 and one terminal of visual indicating device 21. Contact member 18 of switch 12 is connected to the center pole 10a of switch 10, while terminal 10b, associated with the position of actuating handle 11 designated "BZ", is connected to the remaining terminal of audible indicating device 26. Terminal 10c, associated with the position of actuating handle 12 designated "LT", is connected to the remaining terminal of visual indication device 21. With fishing line 13 spaced between contacts 18 and 19, no current path exits to actuate either of the indicating devices. However, when line 13 is removed from between the contacts, a current path exists to the appropriate indicating device as selected by switch 10, thus providing an indication of a fish strike.

To further insure the mechanical integrity of the signaling device, a resilient block-like insulator 29 constructed of a foam-like plastic material or the like, is disposed within housing 2 so as to provide resilient cushioning of the various components. The lower end of insulator 29 rests in the upper surface of audible indicating device 26 so as to urge indicating device 26 between the lower end of insulator 29 and the innermost surface of plug 4 to limit movement thereof. The uppermost end of insulator 29 rests against the lowermost of pin-like terminals 25 associated with indicating device socket 24. In addition, the outer surface of insulator 29 rests against the inner surface of circuit board, 20, thus holding circuit board 20 firmly in place. Finally, a pocket-like notch 30 is formed in the upper end of insulator 29 and holds battery 27 in place against the inner wall of housing 2. It will be observed that indicating lamp 21 and battery 27 may be easily changed as required by removal of dome 3 to gain access to the interior of housing 2.

In operation, housing 2 is secured to a suitable support surface 7 and fish line 13 secured between contact surfaces 18 and 19. The appropriate audible or visual indicating device is selected by switch 10, and fastener 14 of switch 12 adjusted to provide the proper triggering tension. When a fish strikes, producing a pull on line 13 greater than the predetermined force set by adjustable fastener 14, line 13 will be pulled from between contacts 18 and 19 permitting an electrical path to be completed to activate the appropriate indicating device. The indicating device will continue to provide an indication that a strike has occurred until fishing line 13 is replaced between contacts 18 and 19, or switch 10 is returned to the neutral or off position.

It will be understood that various changes in the details, materials, steps and arrangements of parts, which have been hereindescribed and illustrated in order to explain the nature of the invention, may be made by those skilled in the art within the principle and scope of the invention as expressed in the appended claims.

The embodiments of the invention in which an exclusive property or privilege is claimed are as follows:

1. A portable fish alert signaling device for attaching to a fishing line to provide an alarm indication when a fish exerts a pull on the line, said signaling device comprising:

a. A substantially watertight housing;
   b. A source of power disposed within said housing;
   c. A fishing line engaging switch secured to the exterior of said housing, said switch comprising an electrically conducting surface affixed to the exterior surface of said housing and an electrically conducting finger-like resilient movable contact member overlying said conducting surface, said movable contact member overlying said conducting surface, said movable contact being normally urged into electrical contact with said conducting surface, said conducting surface and said movable contact being configured to accept therebetween a filament-like line to bring said surface and said movable contact out of electrical contact;
   d. Indicating means positioned within said housing and connected in series with said source of power, said contact surface and said movable contact, said indicating means producing an alarm signal when said line is removed from between said surface and said movable contact, said indicating means comprising a visually sensible indicator disposed within said housing, and a selection switch mounted to said housing for selectably connecting either of said visually or audibly sensible indicators in said series connection, said switch having an actuating handle positioned exterior of said housing, said switch mounting a thin elongated printed circuit board interior of said housing, said board mounting said visually sensible indicator such that said visually sensible indicator is perceptible exterior to said housing.

2. The signaling device according to claim 1 wherein said housing comprises a generally tube-like enclosure, one end of said housing terminating in a removable optically transmissive lens-like dome forming a substantially watertight seal with said housing, said indicating means comprising a visually sensible indicator disposed within and perceptible through said dome.

3. The signaling device according to claim 2 wherein the periphery of said dome includes at least one slot, said slot slidably communicating with the shank of a headed fastener extending outwardly from and threadedly engaging the exterior of said housing.

4. The signaling device according to claim 1 wherein said conducting surface includes at least one leg extending inwardly through the wall of said housing and forming a terminal for connecting said conducting surface in said series connection.

5. The signaling device according to claim 4 wherein said leg is crimped within said housing to maintain said conducting surface in a fixed position against the exterior surface of said housing.

6. The signaling device according to claim 1 wherein one end of said movable contact comprises a contact surface which overlies said conducting surface, the outermost end of said contact surface being upturned away from said housing, the intermediate portion of said movable contact being generally curvilinear and spaced from said housing surface, the extreme end of said movable contact abutting said housing surface and terminating in a leg extending inwardly through the wall to form a terminal for connecting said movable member in said series connection.

7. The signaling device according to claim 1 wherein said switch includes means for adjusting the force with which said line is held between said conducting surface and said movable contact.

8. The signaling device according to claim 7 wherein said adjusting means comprises a screw-like fastener connected to said movable member and threadedly engaging said housing, said fastener operating to vary the force exerted by said movable contact as said fastener is rotated.

9. The signaling device according to claim 1 wherein said selection switch further selectably connects neither of said indicators in said series connection.

10. The signaling device according to claim 1 including a resilient block-like insulator disposed within said housing, said insulator operating to maintain said source of power, said printed circuit board, and said audibly sensible indicator in place.

11. The signaling device according to claim 10 wherein said insulator includes a pocket-like notch configured to immovably accept said power source.

* * * * *